(12) United States Patent
Powell

(10) Patent No.: US 9,377,902 B2
(45) Date of Patent: Jun. 28, 2016

(54) SYSTEMS AND METHODS FOR WEDGE-BASED IMAGING USING FLAT SURFACES

(71) Applicant: Microsoft Corporation, Redmond, WA (US)

(72) Inventor: Karlton Powell, Lake Stevens, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 656 days.

(21) Appl. No.: 13/769,791

(22) Filed: Feb. 18, 2013

(65) Prior Publication Data

US 2014/0232692 A1 Aug. 21, 2014

(51) Int. Cl.
*G06F 3/042* (2006.01)
*F21V 8/00* (2006.01)

(52) U.S. Cl.
CPC ............ *G06F 3/0428* (2013.01); *G02B 6/0046* (2013.01)

(58) Field of Classification Search
CPC ............ H04N 5/2254; H04N 5/23229; H04N 5/23232; G06F 3/0428; G02B 6/0046
See application file for complete search history.

(56) References Cited

U.S. PATENT DOCUMENTS

| | | | |
|---|---|---|---|
| 6,327,082 B1 | 12/2001 | Browning | |
| 6,871,976 B2 | 3/2005 | Niida | |
| 7,545,429 B2 | 6/2009 | Travis | |
| 8,027,580 B2 | 9/2011 | Chang | |
| 8,160,409 B2 | 4/2012 | Large | |
| 2008/0121787 A1* | 5/2008 | Pyo | G06F 3/0425 250/227.14 |
| 2008/0316768 A1* | 12/2008 | Travis | G02B 6/0011 362/617 |
| 2010/0300608 A1 | 12/2010 | Emerton et al. | |
| 2010/0302196 A1 | 12/2010 | Han et al. | |
| 2011/0115747 A1 | 5/2011 | Powell | |
| 2011/0122095 A1 | 5/2011 | Tsai et al. | |
| 2011/0170849 A1* | 7/2011 | Chang | G03B 17/02 396/322 |
| 2011/0242005 A1* | 10/2011 | Ung | G06F 3/03545 345/173 |

(Continued)

FOREIGN PATENT DOCUMENTS

JP 2006350452 A 12/2006
WO 2013/013610 A1 1/2013

OTHER PUBLICATIONS

"International Search Report & Written Opinion for PCT Patent Application No. PCT/US2014/016152", Mailed Date: May 13, 2014, Filed Date: Feb. 13, 2014, 10 Pages.
Boual, et al., "72.3: Wedge Displays as Cameras", In SID Symposium Digest of Technical Papers, vol. 37, Issue 1, Jun. 2006, pp. 1999-2002.
Wedge Optics in Flat Panel Displays—Published Date: Jan. 18, 2012 Proceedings: on IEEE Author: Adrian R. L. Travis, Timothy A. Large, Neil Emerton, Steven N. Bathiche pp. 16 http://ieeexplore.ieee.org/stamp/stamp.jsp?tp=&arnumber=6134629.

(Continued)

*Primary Examiner* — Timothy J Henn
(74) *Attorney, Agent, or Firm* — Brandon Roper; Judy Yee; Micky Minhas

(57) ABSTRACT

A wedge imager and techniques of imaging with a wedge imager are disclosed. In one embodiment, a wedge image comprises: a simple wedge comprising substantially opposing flat faces; a multi-camera and/or optical system to capture light input into the wedge—which is then partitioned into at least two parities of image content. In another embodiment, image processing techniques are disclosed to correct distortion of each parity image content and merge or 'stitch' the two parities together to form a single image of the object input surface of the shim wedge. In another embodiment, in order to limit extreme high-FOV (field-of-view) requirements, multiple laterally-neighboring narrow sub-sections may be captured by use of an array of the dual-image sensors and imaging optics, along a single end of the wedge.

6 Claims, 8 Drawing Sheets

(56) References Cited

U.S. PATENT DOCUMENTS

| | | | | |
|---|---|---|---|---|
| 2012/0069232 A1* | 3/2012 | Chui | ............... | G02B 26/001 348/333.01 |
| 2012/0127128 A1* | 5/2012 | Large | ............... | G06F 3/0425 345/175 |
| 2012/0206620 A1* | 8/2012 | Findlay | ............... | G02B 3/0043 348/222.1 |
| 2014/0098245 A1* | 4/2014 | Powell | ............... | G06T 5/003 348/207.1 |
| 2014/0111650 A1* | 4/2014 | Georgiev | ............... | G06T 3/4038 348/159 |
| 2014/0361957 A1* | 12/2014 | Hua | ............... | G06F 3/013 345/8 |

OTHER PUBLICATIONS

P-127: Linearity in Flat Panel Wedge Projection—Published Date: May 2003 Proceedings: SID 03 Digest, vol. XXXIV Author: Adrian Travis, Joe Zhong pp. 4 http://citeseer.ist.psu.edu/viewdoc/download?doi=10.1.1.128.5911&rep=rep1&type=pdf.

The Wedge Seeing Smart Displays through a New Lens—Retrieved Date: Nov. 20, 2012 http://www.microsoft.com/appliedsciences/content/projects/wedge.aspx.

Multipoint Wedge Display concept—Retrieved Date: Nov. 20, 2012 http://tronetix.blogspot.in/2010/09/multipoint-wedge-display-concept.html.

* cited by examiner

SYSTEMS AND METHODS FOR WEDGE-BASED IMAGING USING FLAT SURFACES

BACKGROUND

In the area of interactive displays, it may be desirable to achieve interaction—such as touch or gesture—in proximity to the display surface near the XY-position of the interaction. In some systems, it is known to position an array of cameras surrounding the perimeter around the display that may be used to sense gestures. However, there tend to be limits as to how close such interaction may be sensed—as well as difficulties achieving interaction in close proximity to the central region of the display by such means.

To compensate for these limits, some systems have employed a telecentric reverse-projection imaging system that may be used in conjunction with an LCD display, but such conventional imaging system may be bulky—thus, resulting in a display that may be thick. In order to accommodate a thinner form factor, some systems employ imaging system that may be folded optically in air space, allowing fairly thin form factors on order of 5"-6" thick for a 37" display, and even thinner, perhaps 2" to 3", for tiled folded imaging systems.

However, if thinness is desired, then wedge optics may sometimes be used to maintain thicknesses on order of, and possibly below, 1" to 2" for such similar sized displays. To achieve this, some systems employ a massively folded imaging system in a light guide form. However, such a design typically has at least one of the surfaces as a complex 2-dimensional curve profile, which has a thickness profile which starts moderate at the camera thick-end, and then grows smoothly toward first 3rd or so of length, then slopes with slight curvature toward a thin end.

In such systems, however, the imaging region is limited to the last one-half to two-thirds of the length or so towards the thin end. Such systems may thus use two wedges in a 'head-to-toe' configuration. In order to cover the full area of a display placed above the wedge imaging system, each wedge may cover about half the display region. Further, the surface curvature should be accurately fabricated, which may be difficult. In such system, all rays mapping from angle space near camera vision system to position space at the exit face of the wedge, tend to encounter the same number of bounces prior to exiting wedge.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

A wedge imager and techniques of imaging with a wedge imager are disclosed. In one embodiment, a wedge image comprises: a simple wedge comprising substantially opposing flat faces; a multi-camera and/or optical system to capture light input into the wedge—which is then partitioned into at least two parities of image content. In another embodiment, image processing techniques are disclosed to correct distortion of each parity image content and merge or 'stitch' the two parities together to form a single image of the surface of the shim wedge. In another embodiment, in order to limit extreme high-FOV (field-of-view) requirements, multiple laterally-neighboring narrow sub-sections may be captured by use of an array of the dual-image sensors and imaging optics, along a single end of the wedge.

In one embodiment, a wedge imager is disclosed where said wedge imager comprises: a wedge, said wedge comprising material capable of transmitting light; said wedge further comprising a first substantially flat surface and a second substantially flat surface; said first substantially flat surface and said second first substantially flat surface disposed such that light entering said first substantially flat surface is capable of being guided down said wedge to a first end; an optical system, said optical system disposed at said first end and capable of accepting said light guided down to said first end and imaging said light after a single pass through said wedge.

A method for image processing light data from a wedge imager is disclosed where the wedge imager comprises: a wedge, a first image sensor and a second image sensor, the method comprising: inputting image data from a first image sensor, said first image sensor capturing image data of a plurality of bands from a first parity of light transmitted by a wedge imager, said wedge imager comprising a first substantially flat surface and a second substantially flat surface; inputting image data from a second image sensor, said second image sensor capturing image data of a plurality of bands from a second parity of light transmitted by said wedge imager; mapping each said band from said first parity and said second parity according to an arc segment associated with each said band to form a plurality of undistorted arc segments, each undistorted arc segment associated with one of said bands; and stitching the image of each of said undistorted arc segments together to form an image input at the first substantially flat surface.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
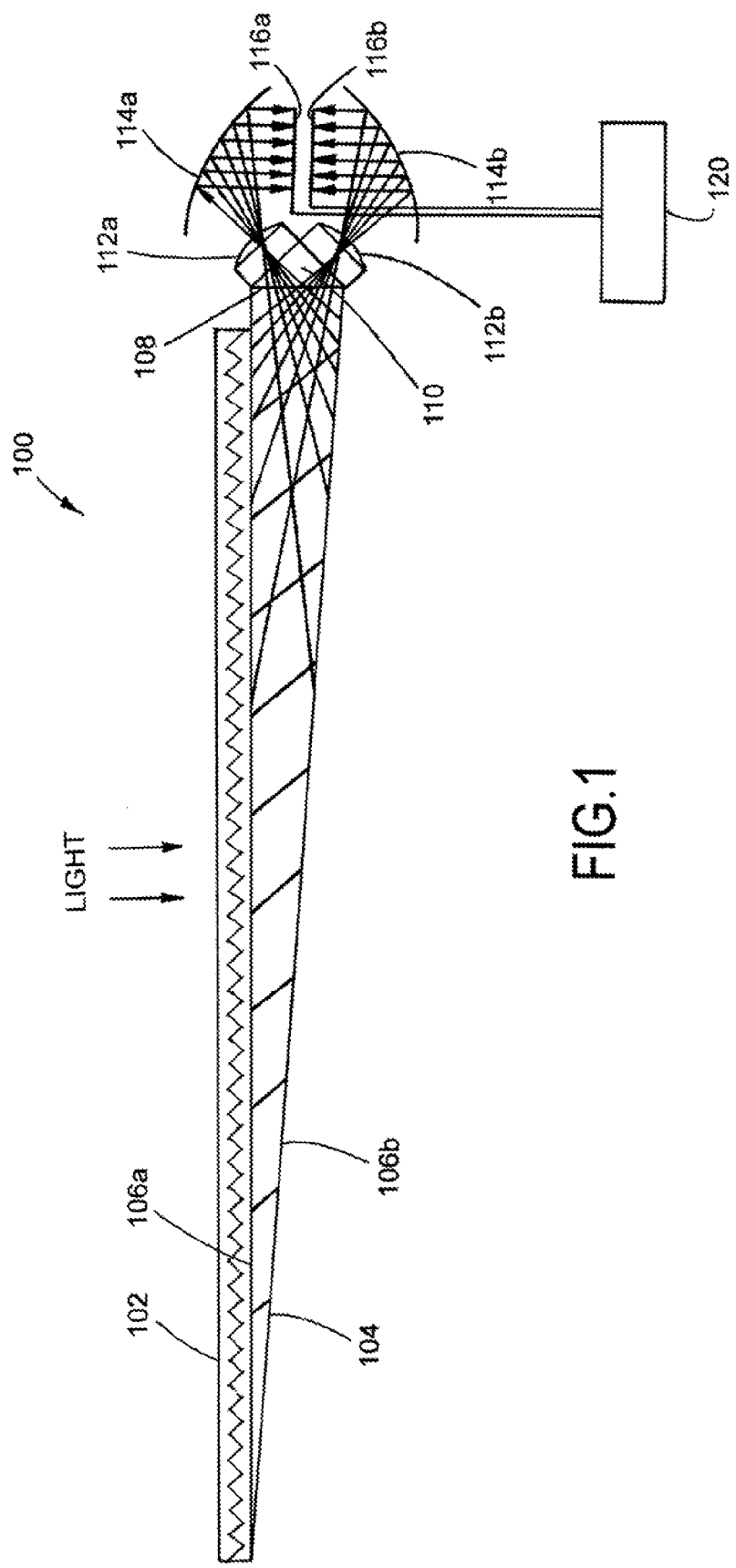
FIG. 1 depicts one embodiment of a wedge-based imaging system using flat face surfaces.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

In many embodiments of the present application, alternative imaging structures are disclosed that comprise simple wedge-like structures. The use of such wedge-like structures tends to simplify hardware fabrication requirements. By using wedge-like structures, together with some image processing (as further described herein), it may be possible to reduce the cost of imaging.

FIG. 1 is one embodiment of a wedge-like imager 100. Imager 100 may comprise an optional turning film 102 placed on top of shim wedge 104. Wedge 104 comprises a transparent or translucent material—e.g., glass, plastic and any other known optical material suitable to transmit light for the purposes of imaging. Wedge 104 also comprises two substantially flat (or linear) surfaces 106a and 106b. Bottom surface 106b may comprise the surface of a mirror (e.g. metal or dichroic)—or some other suitably reflective surface—e.g., either on surface 106b or a reflector or partially reflective layer or film adjacent to surface 106b. Light from object enters the wedge at a first substantially flat surface as indicated by the arrows in FIG. 1—and through a set of reflection (as described further herein) transmits down (or is otherwise guided down) the wedge to an optical system at one end of the wedge (e.g., the thick end). In this embodiment, the light entering the optical system may be imaged after only a single pass through the wedge—that is, the light does not need to bounce off the thick end to re-traverse the wedge and return to the optical system.

One embodiment of a suitable optical system may comprise several optional components, as shown in FIG. 1. Light enters the optical system at aperture 108. Light escaping from aperture 108 inputs into exit prism 110—and into an optical imaging system and/or optical pathway that comprises relay lenses 112a and 112b, mirrors 114a and 114b and finally to image sensors 116a and 116b. As will be described, the light entering the wedge imager 100 tends to be split into two parities—which ultimately leads to sensor 116a (i.e., detecting light from a first parity, A) and to sensor 116b (i.e., detecting light from a second parity, B).

In this embodiment, by using image processing capability, the resulting image content from the surface (102) being captured in these two 'parities' (i.e. A or B, upward and downward) may then be distortion-corrected through such processing, and stitched to achieve the image of the surface. In an embodiment in which it is desirable to imaging touch, a diffuse layer may be added above the turning film layer to enhance acceptance of light from objects on surface.

In another embodiment, the wedge stack may utilize low index adhesive instead of air gaps for the purpose of forming a monolithic optical stack. For example, a low index adhesive between turning film layer and wedge guide, as well as similar index on opposing face of wedge guide, may be desirable. In such instance, a diffuse layer, whether a volume diffuser or surface relief diffuser, may be laminated on object surface side of turning film layer.

In another embodiment, a present system may be further corrected to image beyond the surface, with the additional requirement of correcting the 'lensing' effect of each imaging 'band' across the exit surface of wedge, as by a macro lenslet array disposed above the turning film layer and comprising a pitch, layout and shape corresponding to bands of acceptance of the wedge guide.

Also shown in FIG. 1, a processor 120 may receive the image data from sensors (e.g., 116a, 116b or the like) and perform image processing routines, such as described further herein. It should be appreciated that processor 120 may comprise suitable computational modules and computer storage (e.g., RAM, ROM, flash, external readable memory) that may further comprise computational routines, image maps stored as Look Up Tables (LUTs) or in other known data structures that would be suitable for mapping the image data from the sensors to reconstruct the image associated with the light entering the wedge imager. Such reconstructed image may be output to any device (e.g., panel, display, television, printer) that may accept image data and render it to a viewer.

In the embodiment of FIG. 1 and other embodiments herein, it is possible to achieve a thin form-factor, large-area imaging solution which may comprise a combination of (1) a simple wedge having opposing flat faces, (2) a multi-camera and optical system to extract both parity A and parity B from the image content on the surface of the imager, and (3) image processing to correct distortion of each parity image content and merge or 'stitch' the two parities together to form a single image of the surface of the 'shim' wedge imager. In another embodiment, in order to avoid or limit extreme high-FOV (field-of-view) requirements, multiple laterally-neighboring narrow sub-sections may be captured by use of an array of the dual-image sensor cameras and imaging optics, along one or more lengths (e.g., single thick-end, orthogonal imaging section(s)) or one or more corners at the thick end (e.g., two diagonal).

Alternative Embodiments

In some embodiments, a wedge imager may use an off-axis section of an aspheric lens and/or mirror to achieve a mapping—as well as to possibly help correct the Scheimpflug relation of imaging conjugates for various object distances.

In other embodiments (as further discussed herein), it is possible to combine a shim wedge imager with the following optional aspects, such aspects comprising: the use of simple, flat surfaces; no end reflector; imaging within a single pass; the use of knowledge of A & B parity to form image via image processing; wedge imaging that may not require same number of light bounces (as some other prior art wedge imagers do); imaging a 'saddle-shaped' surface and employing an imaging 'arc'; employ an array of sensors along edge as needed; employ radial turning film, such film comprising tiled arc sections for each defined imaging region, which may improve scenarios intended to image at multiple-z-object-planes.

For embodiments designed to image beyond the surface, an arc'd lenslet array layer may be used to correct optical power in each of the exiting or input wedge 'bands'. Such a lenslet array may have lenslet profile, aspheric in 1-dimension having power vs. angle profile as needed to pseudo-collimate light entering wedge acceptance, and pitch registered with each wedge input band. The arc layout and shape, and pitch variation, of lenslets may be used to conform to match the bands of acceptance of wedge.

In another embodiment, it may be possible to employ a folded version of the imager using aspheric mirror—such folded version may potentially reduce imaging system volume/thickness further by adding an optical fold of imaging path parallel to the dimension along guide thick-end.

In yet another embodiment, it may be possible that—while the previous embodiments comprise a wedge having flat surfaces, it may also be possible to do so in 1D as well as 2D, such that the wedge has linear taper. In such an embodiment, it may also be desirable to form a wedge having linear taper of revolution, thus forming a wedge cone. Such surface may be less complex compared to the rise-and-fall curvature of other conventional wedge panels. Such conic wedge using multiple camera systems may be formed by tiling the multiple conic wedge sections by tiles or in a monolithically fabricated tiled guide. Further still, it should be noted that the overlap of bands which naturally takes place due to propagation distance differences near thick end and away from thick end, may be sharpened (as an alternative to use of an aperture), by forming a slight curvature on one face of the wedge. This curvature may not rise and fall as in conventional wedge imagers, but may be monotonically declining from thick end.

All such embodiments may utilize a (1) front lightguide (LGP-based illumination placed at top and possibly thin in form factor) to provide illumination of object which then reflect into system to be imaged, or (2) a backlight for the case of using a dichroic bottom reflector/mirror which has the ability to reflect high angle light, yet transmit low angle light (for case of using IR illumination, this serves as an angular selective filter/mirror, diffusion by an additional diffuser may be added to improve acceptance into wedge), or (3) light delivered through wedge in reverse through thick end, lateral to the vision system(s).

Aspects/Embodiments of Shim Wedge Imaged Object Surface-Character

As mentioned, a simple wedge imager having flat faces may be considered less difficult to fabricate than curved surfaces, but such wedge may not inherently image all portions, or bands, of an imaging surface in a single coherent image. In addition, a wedge imager may tend to further exhibit a parity effect such that only bands corresponding to one of either even or odd parity, across the input face of the wedge, may be seen at a time—depending on whether a camera is imaging into the thick end pointing in an upward direction or a downward direction. Further, since the apparent distance of the surface to be imaged varies with angle of view of the camera, it is difficult to focus content emanating from all bands of a given parity at the same time.

Figure 2:
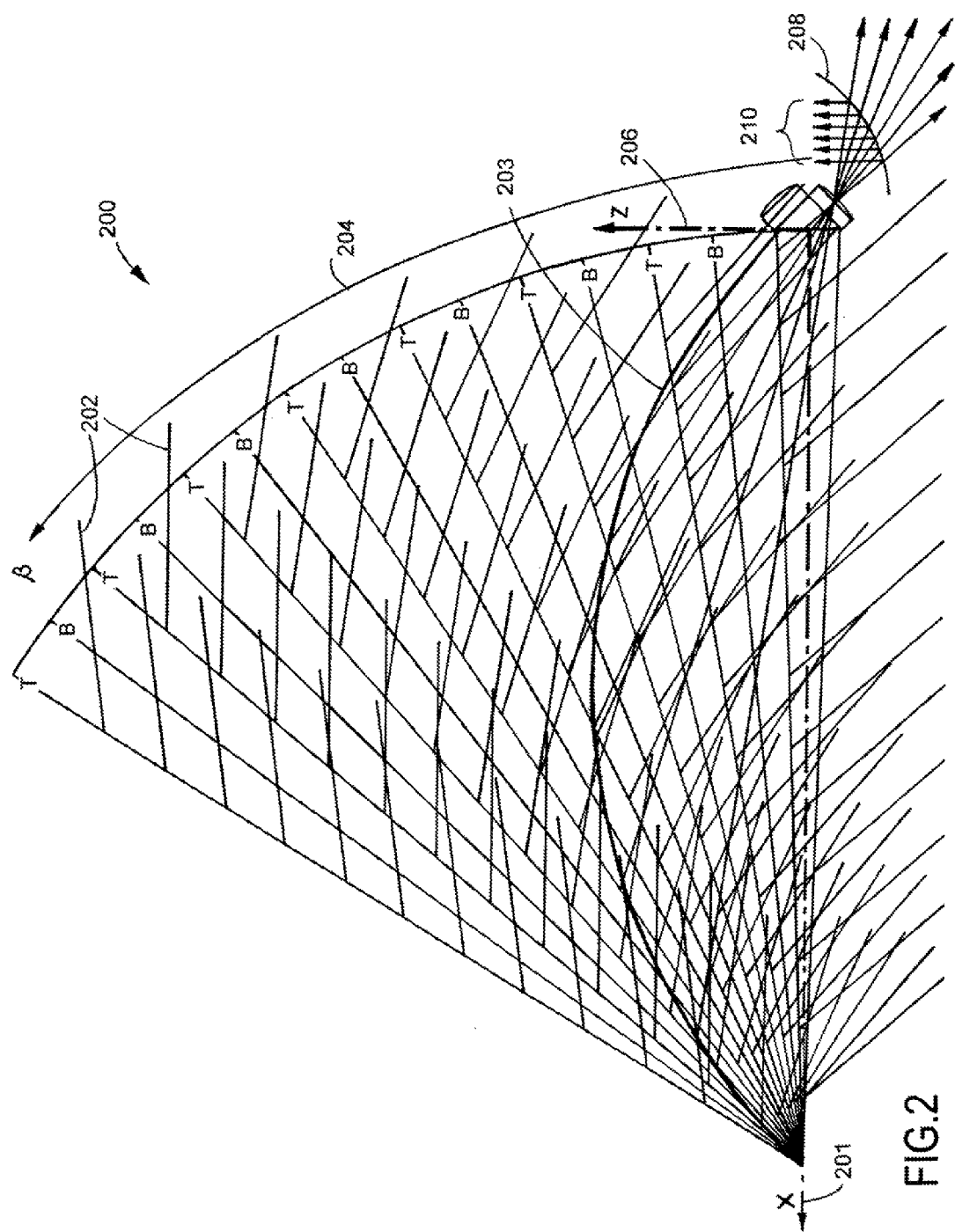
FIG. 2 illustrates an imaging wedge pie-shaped optical schematic, showing the arc'd imaging surface for which it is desired to form a conjugate image at the sensor plane.

Thus, to illustrate the above described nature of wedge imaging (as produced by wedge imager, such as in FIG. 1), FIG. 2 illustrates the concept as to how the bands of a given parity may be allowed to simultaneously form/focus at a prescribed imager plane in order to capture image content emanating from the sets of bands within each of the two parities—e.g., by use of two opposing imaging vision systems, each one viewing a given parity of image bands.

While image content tends to be distorted in arc segments, each arc segment corresponds to a band of captured image content from the input face of the wedge, in an interstitial fashion between parities. In order to utilize such image content, this image content may be corrected. Correction may be achieved by undistorting the arc segments within the image into undistorted arc segments which map to the input face of the wedge. The resulting undistorted arc segments represent position space in a mapping of angle space to band input position across the wedge input face, and thus are dictated by parameters which include a point of origin of viewing—e.g., such as the lens location laterally along the thick end of the wedge, and position from that point of origin and position across wedge input face.

Once each set of bands for a given parity are corrected, then the bands may be stitched together, in an alternating fashion, since they are produced interstitially at input face, in order to form a full image of objects at the input face of the wedge. In some embodiments—e.g., such as using moderate finite aperture size, the bands may include a slight overlapping region which allows further edge matching conditions to be utilized in the case of using calibration boards.

Since light is being guided by TIR (total internal reflection), there is a discrete angle within the FOV at the viewing position at thick end which corresponds to the position across wedge input face where the light is allowed to escape TIR, thus mapping position at input face to angle within imaging FOV. FIG. 2 depicts an ideal curved imaging surface profile which should be mapped to the image sensor via the optical imaging system—for each of the two parities A & B (i.e., optical layout of upward parity portion is shown). FIG. 2 illustrates an optical layout representing the optical path of light from objects accepted into wedge guide and propagating to the thick end, by drawing adjacent wedge pie sections which are flipped in alternating fashion—such that bounces of light at the top and bottom faces of guide are illustrated by straight line paths from acceptance to the thick end.

In FIG. 2, the top surface bound faces are denoted as "T"; while the bottom surface bounces faces are denoted as "B". It may be seen that that the light rays (e.g., several labeled as "200" for example) are depicted entering the wedge imager. Lines 202 represent the local critical angle along wedge guide face, which indicates where light may be accepted by the wedge and enter into TIR guiding. When light at the input face meets the critical angle of the guide, and matches the acceptance of the imaging optics, such as a ray from origin at thick end matching critical angle in guide media, the number of bounces of light from input acceptance to origin at thick end is defined as the number of intermediate pie section surfaces the line ray passes through toward thick end. In such a layout, it is apparent that the overall profile of the imaging surface is the arc imaging surface 203.

While the number of bounces for any ray on path to origin xz is a discrete integer, and does exhibit a fine-grained step pattern underlying the macro figure, a general profile of this imaging surface may be approximated as an arc. In such a case, an angle $\beta$ may be used, in general, to represents the tilt of the wedge stack required for an input ray to be accepted into wedge guide and pass near or through origin into imaging optics/optical system, for a given angular direction within the imaging field of view (FOV). As shown, object light near the thick end requires fewer bounces to be accepted into imaging system thus lower $\beta$, while object light near thin end requires more bounces thus higher $\beta$. By forming a profile across all points of intersection of local guide critical angles matching ray angles within FOV of imaging optics, near origin, the surface to be imaged through wedge optic may be assessed As may be seen, imaging arc 203 depicts the actual TIR-escaped imaged surface for the shim wedge. It should be noticed to be a laterally-upwards saddle-shape—however, it is substantially described as arc 203 within the zx plane of interaction. As the rays are escaping (via actual TIR), an off-axis, conic lens and/or mirror 208 help to correct any Scheimpflug-related variable object distance vs. angle within FOV and to constrain the angular character of the image.

Ray Fan Mapping

Figure 6:
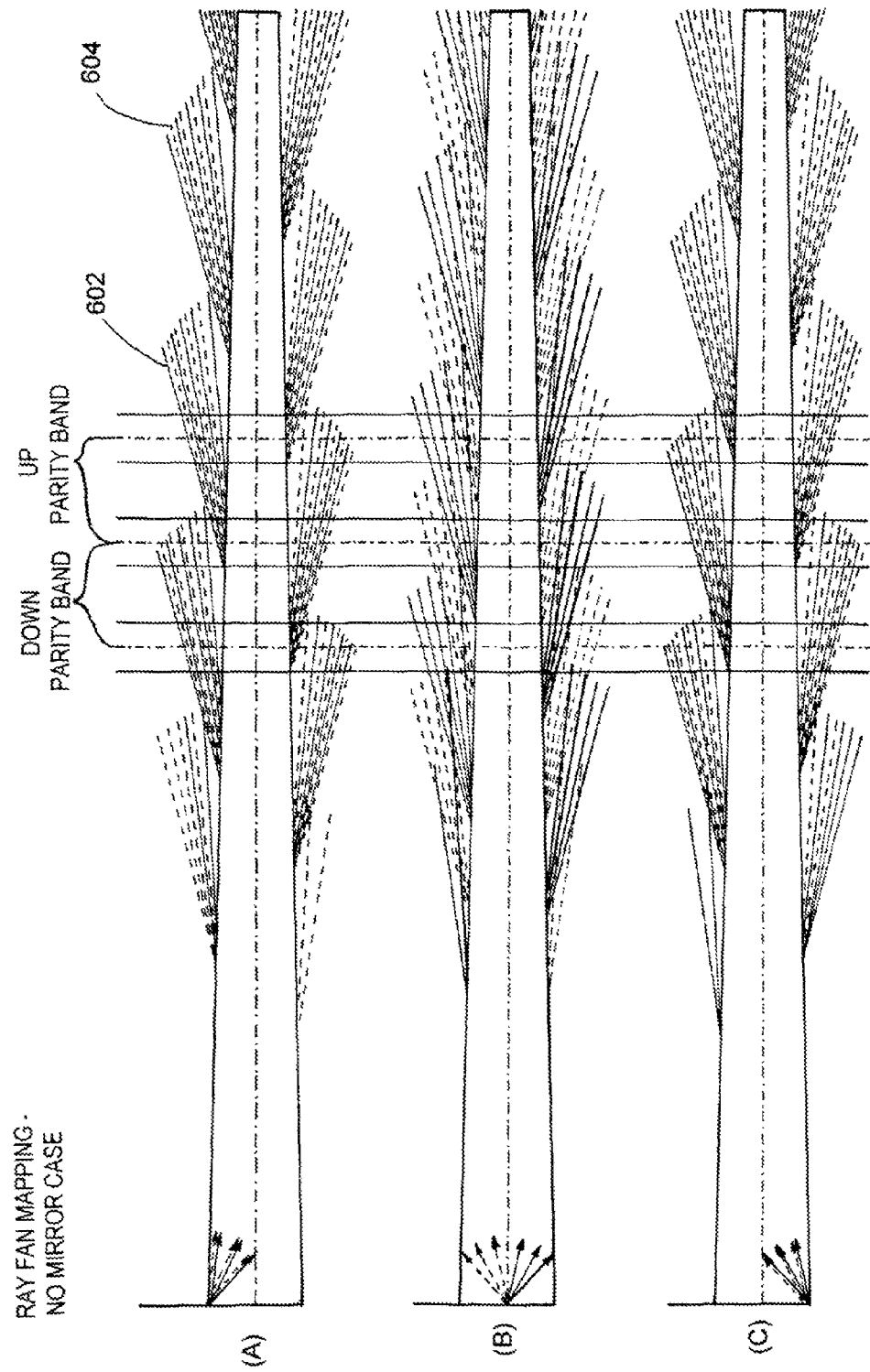
FIGS. 6A, B and C show ray fan mappings for positions of acceptance at opposing wedge input faces to angles at thick end.
Figure 7:
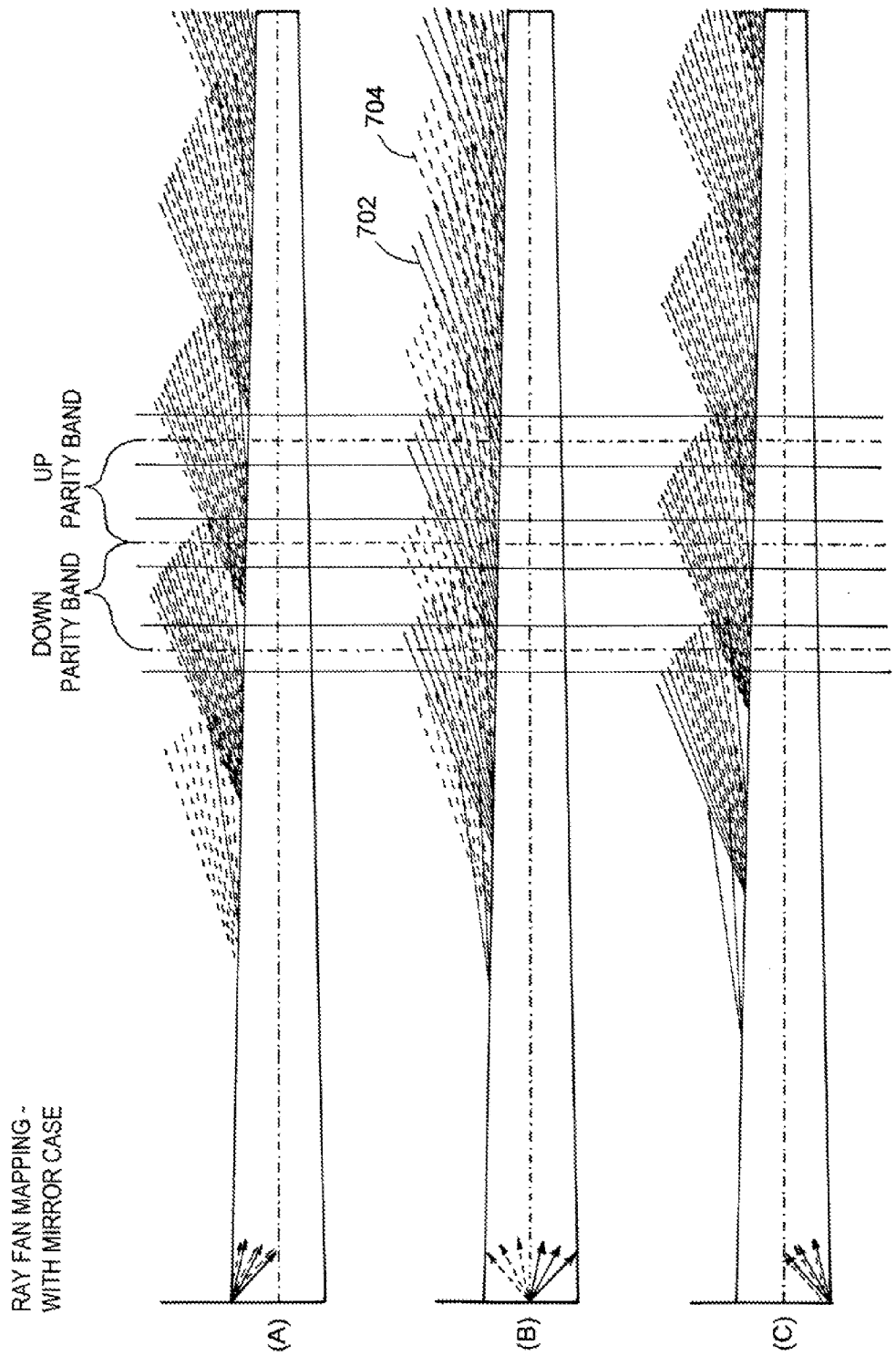
FIGS. 7A, B and C show ray fan mapping for positions of acceptance at the wedge input face to angles at thick end for the case of using a bottom reflector.

FIGS. 6A, B and C and 7A, B and C illustrate how angle space at the thick end corresponds to position space at the exit face of the wedge optic. It will be note how both parities—'up' parity 604, 704, 804 (in dotted lines) and 'down' parity 602, 702, 802 (in solid lines), correlate to discrete band locations across the wedge input face, in an alternating fashion. FIGS. 6A, B and C are cases where no mirror is used—while FIG. 7 depicts the case of using a mirror below the wedge (as in FIG. 1). It should be noted that a single face can contain both image parities at thick end by making use of a reflector on the opposing side of wedge optic. FIGS. 6 A, B and C and FIGS. 7 A, B and C also depict how light propagates through the wedge and end up at the thick end.

Figure 8:
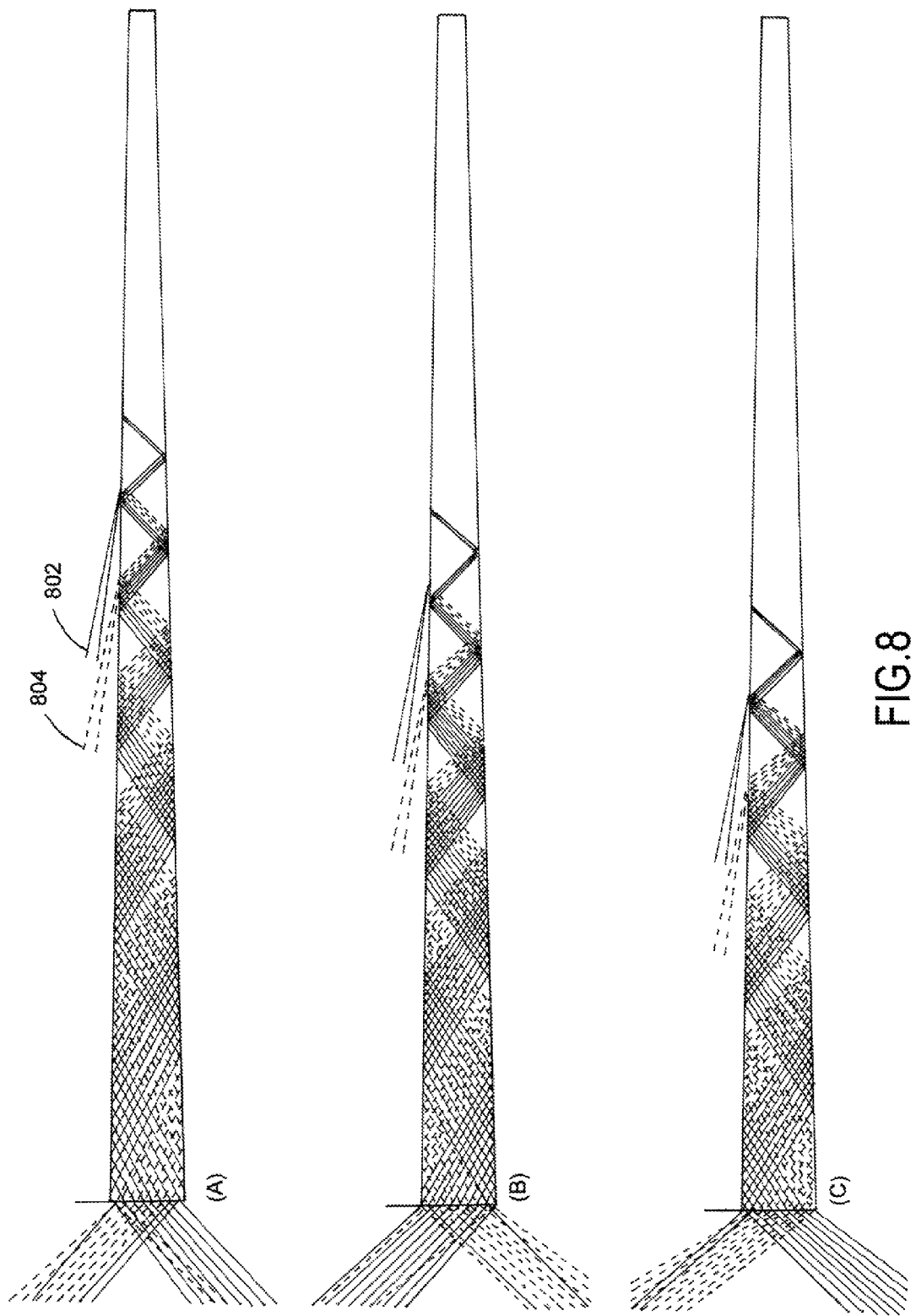
FIGS. 8A, B and C show two bundles of acceptance at positions along wedge, separated by the width of an imaging 'band', for some exemplary positions.

FIGS. 8A, B and C Illustrate how ray bundles, within wedge angular acceptance, may show (1) how the divergence is reduced for ray bundles from bands near thick end due to fewer bounces, (2) parity switches as a ray bundle emanates from a position shifted by a width of a band across wedge input face, and (3) angle of pointing, relative to wedge guide bisector, of ray bundle reduces for ray bundles emanating from bands further away from origin defined at thick end. The angular character illustrates a mapping of position space across wedge input face to angle space at thick end exit point. Such light can then be transmitted through imaging optics including an aspheric mirror to image a full set of bands for each of the two parities.

In addition, several of these example rays are shown emanating from two neighboring bands across wedge input face. It should be noted that: (1) rays emanating further away from thick end have reduced divergence due to additional bounces; (2) the positions of the narrow diverging bundles map to different pointing angles at the thick end, and (3) all ray bundles emanating from the same band exhibit similar divergence. Since the ray bundles slightly diverge, and have greater divergence for rays emanating closer to camera system viewing origin point, it may be seen that ray bundles corresponding to higher angles at thick end, require higher power, thus a smaller mirror curvature, than ray bundles corresponding to lower exit angles at thick end, which are not as divergent, thus an aspheric mirror section, or a conic section, may be used to correct both focus as well as direction onto an image sensor plane.

Image Processing Embodiments

As the bands may appear to emanate from a significantly tilted curved surface, a traditional camera lens/optical system with sensors may not be able to maintain focus on all bands within a given parity simultaneously. In such an embodiment, an aspheric lens function (i.e., lens or mirror), such as the off-axis tilted mirror (as shown in FIG. 1) may be used to form a more adequate imaging system to image the conjugate surfaces: (1) effective wedge input curved (e.g., arc'd and saddled) surface and (2) the plane containing image sensor region.

Such aspheric imaging optics may then be used to form an image of all bands within a given parity on one of either of the two opposing vision systems. It may be desirable to place the two opposing vision systems at the same position along the thick end, one viewing upward and the other downward, in order to capture full content of both parities in the resulting two images. The arc segments may then be undistorted according to the angle-to-position mapping of the wedge for a given viewing position.

Figure 3:
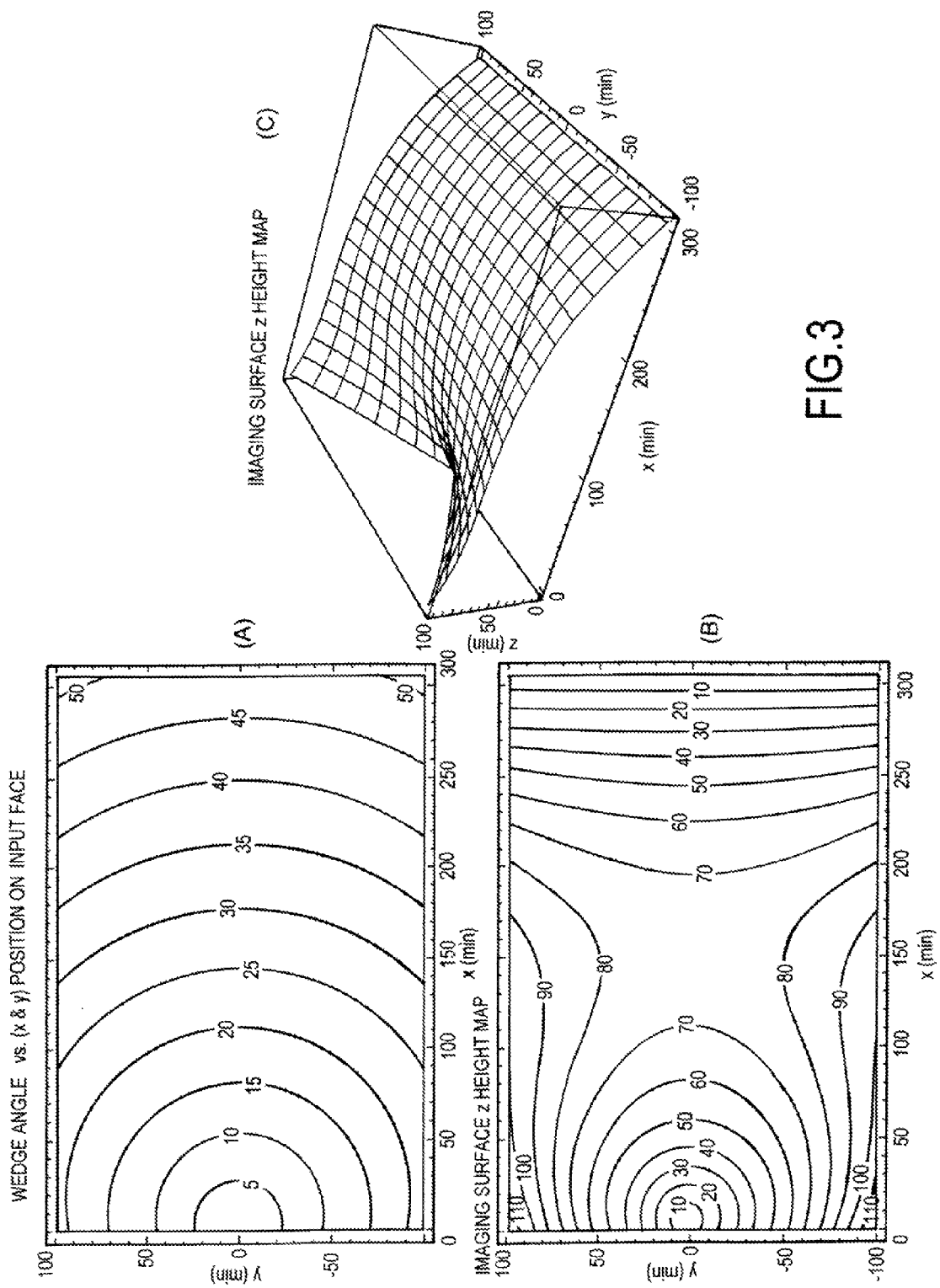
FIG. 3A, FIG. 3B, and FIG. 3C depict a mathematical description of the image conjugate surface, of one parity, as seen through wedge guide thick end, desired to be imaged.

One embodiment of a suitable mapping is depicted in FIGS. 3A, 3B and 3C. In order to determine a mathematical description of the arc'd imaging surface 203 depicted in FIG. 2, the matching condition for mapping xy position across the wedge face to the wedge layout angle β may be determined by geometry and an input to output ray matching condition. FIGS. 3A, 3B, and 3C show results for the case of a 200 mm wide by 300 mm long wedge region. Depicting such mapping for the wedge optic alone, FIG. 3A shows a contour plot of the wedge layout angle β required for each xy position across the wedge input face. By converting this angle mapping to a height map, FIG. 3B shows a sag height of the resulting arc'd imaging surface 203 with respect to distance from the xy plane along z. FIG. 3C simply shows the same data of FIG. 3B in a 3D perspective. It should be noted that the origin is defined at (x,y)=(0,0), such that origin is located at thick end and centered with vision system at y=0. It should be noted further that wedge layout angle β exhibits a pivot point defined at the wedge apex, which is located at the thin end of the wedge guide in the case shown. It should also be noted that it is possible to utilize portions of the wedge which do not necessarily require inclusion of this apex point, however such point, whether real or virtual, may be included in the calculation to form the wedge angular layout as shown in FIG. 2. It should be noted that the surface to be imaged is approximately an arc within the plane containing the wedge, and it is possible to describe it mathematically as a curved surface.

In order to determine this curved surface to be imaged, a mapping may be determined of the position at input face to view angle at the thick end of wedge. As shown in FIG. 2, if a schematic of the optical wedge is drawn, including all bounces of light off surfaces, up to the point of escaping (or in this case entering) TIR, or the angular acceptance of the wedge, then the overall surface may be mathematically mapped on the input face. If angle β represents the angle, in pie-shaped schematic, of the wedge input face for a given input position across face, then it is possible to create a contour plot of the relationship mathematically, such as the contour plot shown in FIG. 3A. The contour plot may be determined either via mathematical modeling, heuristically or by experimentally testing images. Once the contour plot is determined, it may be stored in computer storage (e.g., RAM, ROM, flash or the like) and accessed by a processor for suitable image processing.

It should be note that while this plot shows a continuously smooth contour, in reality there may be some discretization or quantizing of the possible wedge angles, since in reality, the wedge optic has a given wedge angle associated with it, and the reflections, or bounces, which may be optically schematically treated as top or bottom flips of the wedge optic, are integer multiples of flips between input of light and exit through thick end.

In such sense, the contours would in reality become steps, but still, the overall curved surface to be imaged would be the key to overall imaging of the FOV. It may also be noted that when the relationship is translated into a sag height (or distance) relative to a plane bisecting the wedge optic, the result is shown in FIG. 3B. Further, a 3D plot of this surface sag height map may be rendered as in FIG. 3C. In so doing, it may be shown that the overall object to be imaged within the vision system FOV is an arc'd imaging surface with a slight saddle shape in the lateral xy positions. For the wedge length shown, from wedge pivot point to defined origin, this resulting example curved surface is the surface for which it is desired to form a conjugate image at the sensor plane.

The wedge layout angle β, a condition for the light to escape TIR within wedge, may be described in terms of xy position across the exit face (i.e. the left side of FIG. 3A). The resulting shape of the surface which is desired to be imaged is shown in FIG. 3B, and in 3D at FIG. 3C. As seen in FIG. 3C surface topography, by imaging a narrow section which starts a slight distance away from origin, the large FOV and large depth of field requirements on optics may be reduced. Tradeoff could be considered as chin length, and use of array of imager systems.

As before, these mappings and/or plots may be determined either via mathematical modeling, heuristically or by experimentally testing images. As before, once these plots are determined, they may be stored in computer storage (e.g., RAM, ROM, flash or the like) and accessed by a processor for suitable image processing.

One Embodiment

As in FIG. 1 and embodiments of the kind, the linear-faced wedge imaging system may be formed by making use of additional components which may comprise: an aperture at thick end, a prism centered at profile of thick end having two symmetric faces opposing the thick end, two lenses placed near prism outer faces, two aspheric mirror sections (e.g., having a suitable tilt), and two image sensors. An optional aperture placed between or embedded between the prism and thick end of wedge may improve the sharpness of transition between bands, but exhibits a tradeoff of efficiency, as the smaller aperture used, the less efficient the system. In some embodiments (e.g., in FIG. 1), it may be possible to place the image sensors nearly back-to-back in somewhat close proximity.

In an alternative embodiment, in order to allow higher resolving, a more complex imaging lens system (e.g. in which the system may include a fold), may be placed near the prism, in order to fold the orientation of the aspheric mirror to the lateral side along wedge thick end. In so doing, the two parity imaging systems may be folded in opposing fashion about the prism viewing point. This may allow for use of a relay lens added between the aspheric mirror and image sensor plane in order to improve imaging resolve, and adds length to the optic system. Further, the aspheric mirror may be a concave reflective surface in a low refractive index environment, i.e. air n=1. Further still, the aspheric mirror may include input and output faces and be made of an optically transmissive media having refractive index greater than that of air, i.e. a polymer or plastic optical media core such as acrylic (PMMA) or polycarbonate, such that the outer surface of the aspheric region may be either reflective coated, or designed to support TIR (total internal reflection) without coating, enabling reflection of light illuminating the aspheric surface, while allowing transmission of the input and exit light through aspheric element. Further, in some scenarios, which may provide cost and performance tradeoffs, the relay lens may be omitted and the imaging optics may include both wedge optic and aspheric mirror in a single molded part, with or without an embedded aperture. In other embodiments, it may be possible to use a family of aspheric designs, including conic surfaces, as alternative embodiments.

Figure 4:
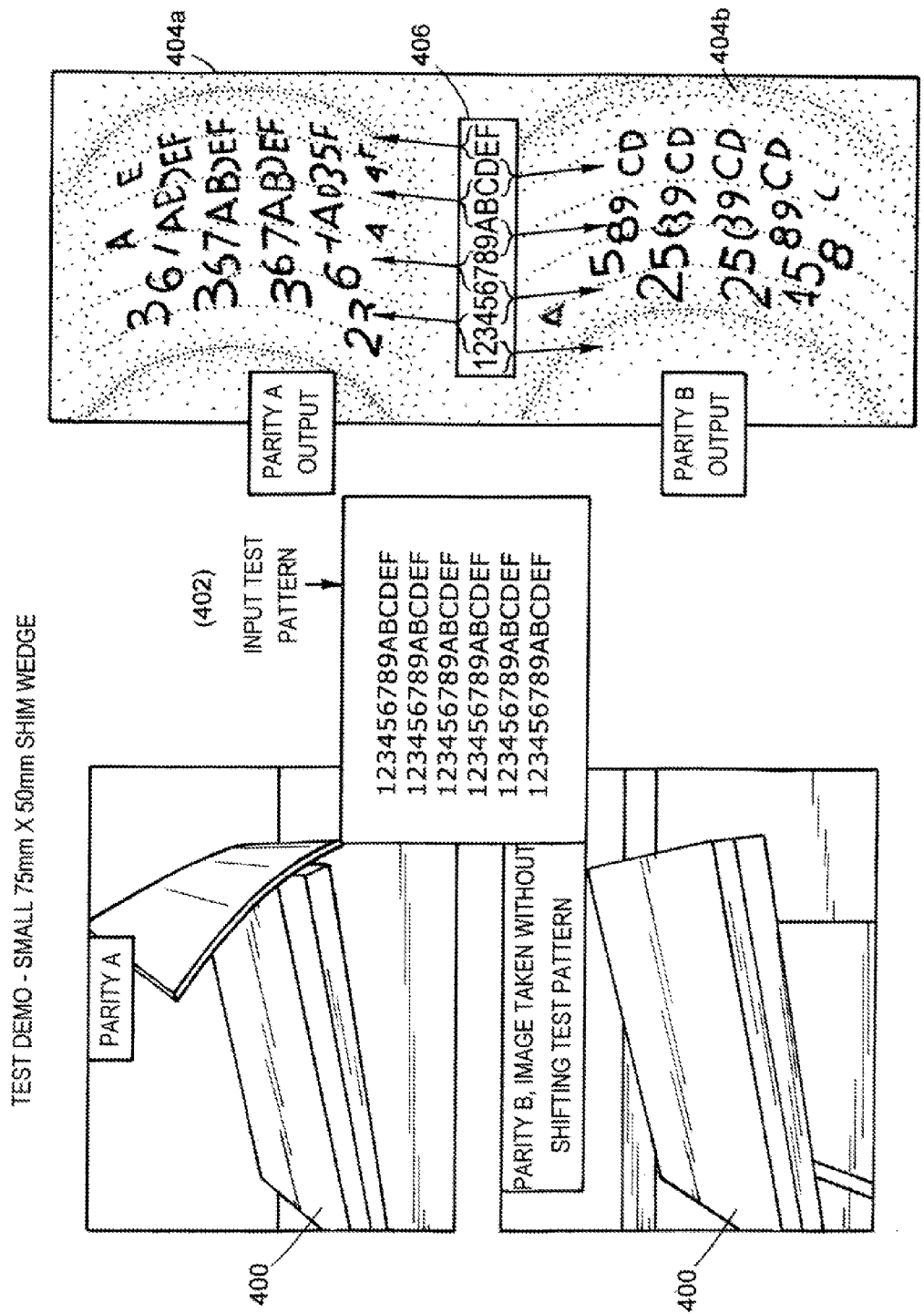
FIG. 4 depicts a result of a demonstration test of an imaging wedge.

In one embodiment, the shape of the aspheric mirror may be optimized to produce optimum control of pointing of the imaged light as well as resolving capability of the imaging system. FIG. 4 depicts a set of actual pictures captured using a wedge imager test setup (400) which included a parabolic mirror which had been sectioned and tilted. An input test pattern 402 ("123456789ABCDEF") was imaged—and the resulting parity A output (404a) and parity B output (404b) were captured. With the image "stitching" algorithms (e.g., based on the contour plots previously modeled and/or constructed), the resulting image 406 was "stitched" together from parity A and parity B outputs.

Figure 5:
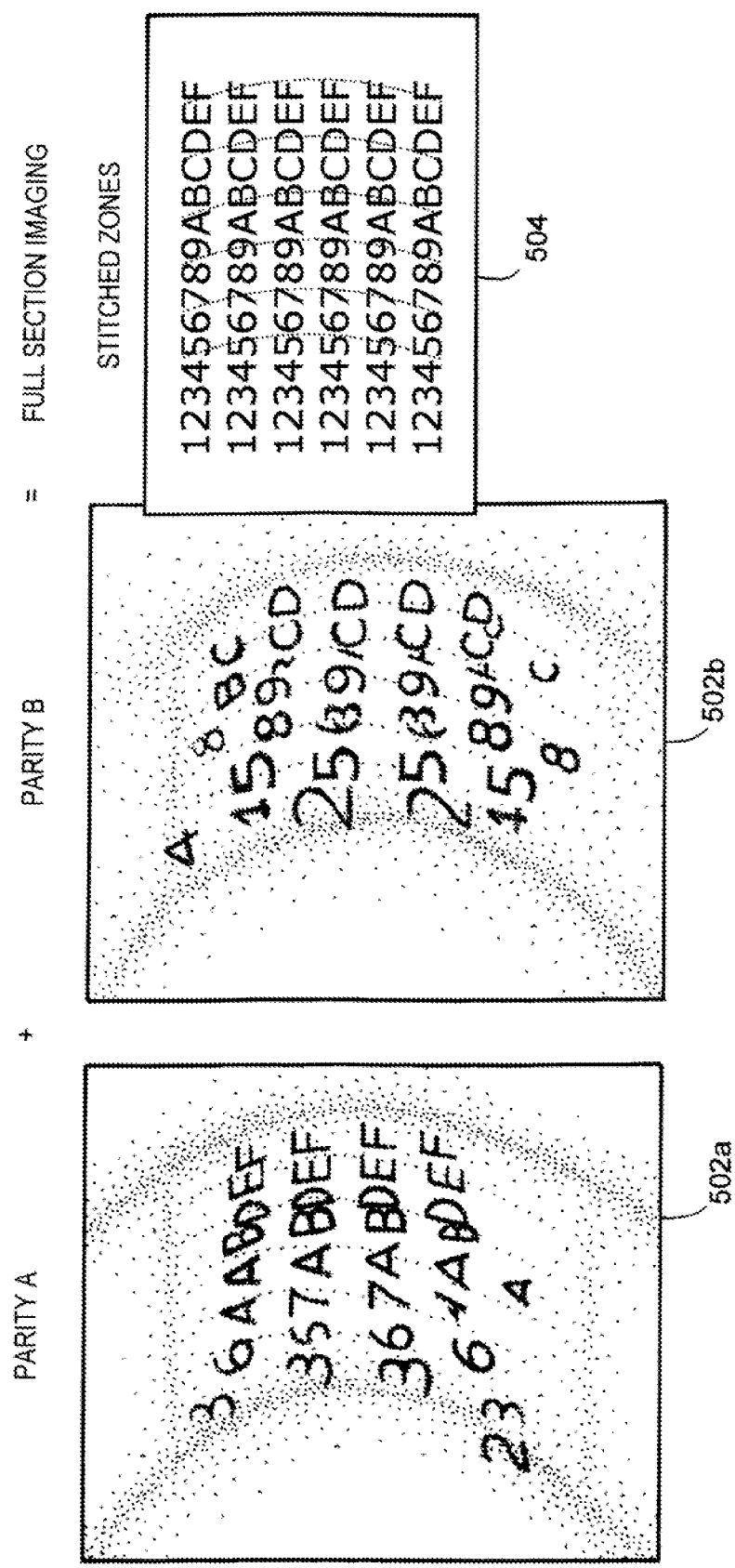
FIG. 5 illustrates the method of capturing two distinct parity images, A & B, and undistorting and stitching the two parity image content to form a corrected complete image of object content at input imaging surface.

FIG. 5 depicts another set of actual images as captured with the wedge imager test setup, as shown in FIG. 4. As may be seen, parity A image 502a and parity B image 502b are distorted as previously described. Employing suitable image processing (e.g., stitching), it is possible to recover the original image of object at imaging surface by "stitching" the zones together (as depicted in 504).

Alternative Embodiment for Image Correction

While the above-described mapping may be used to form the image distortion correction and subsequent stitching to form a complete image of input face object FOV, it may also possible that the correction may further be achieved by use of grid or checkerboard patterning on calibration type boards. In one embodiment, a calibration board having a rectilinear grid pattern, with distinct features, dots, or icons, representing each discrete grid location within the rectilinear grid, may be used. In such case, the features may be determined from the distorted vision image of each parity, and the knowledge of location at input face may be used to form the mapping to undistort the image.

In another scenario, two distinct calibration boards may be used. One may have a banding pattern which nearly matches the ideal arc's across wedge input face, but having white (bright in image) 2-band-width arcs which are oversized in width compared to 2-band-width black bands (dark in image). This first board is placed in a predefined xy placement within manufacturing tolerance error, in order to image only every other band within a first parity, thus then using the outline of the bands to form the mapping for distortion correction of each band segment. A nearly complementary board, switching white and dark, yet with slightly broadened white neighboring bands (2-bands wide each) may be used to capture the complementary bands in opposing parity.

It should be appreciated that various other shapes of input face region may be captured by design, including square, triangular, diamond, or rectangle. For example, a narrow and deep rectangular region may be captured with less lateral distortion, as the width of capture region is reduced. Such an embodiment may utilize an array of vision systems along a thick end edge. Difficulties of lateral viewing at wedge face positions close in proximity to origin of viewing may be reduced in some cases by corner viewing, for instance. However, it is possible that an array of vision systems may provide suitable results, as long as the system allows for stitching of each of the finalized full images of each region.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for image processing light data from a wedge imager, said wedge imager comprising: a wedge, a first image sensor and a second image sensor, the method comprising:
    inputting image data from the first image sensor, said first image sensor capturing image data of a plurality of bands from a first parity of light transmitted by the wedge imager, said wedge imager comprising a first substantially flat surface and a second substantially flat surface;
    inputting image data from the second image sensor, said second image sensor capturing image data of a plurality of bands from a second parity of light transmitted by said wedge imager;
    mapping each said band from said first parity and said second parity according to an arc segment associated with each said band to form a plurality of undistorted arc segments, each undistorted arc segment associated with one of said bands; and
    stitching the image of each of said undistorted arc segments together to form an image input at the first substantially flat surface.

2. The method of claim 1 wherein mapping each said band further comprises:
    mapping the image input at x-y positions across said first substantially flat surface substantially to a wedge layout angle $\beta$.

3. The method of claim 2 wherein mapping the image input at x-y positions further comprises:
    converting said wedge layout angle $\beta$ to a sag height of the resulting arc'd imaging surface.

4. The method of claim 3 wherein said method further comprises:
    constructing a contour plot, said contour plot mapping image data at said xy positions and z positions from said first substantially flat surface to said bands of image data;
    mapping said bands of said image data to substantially image the light input into said first substantially flat surface according to said contour plot.

5. The method of claim 3 wherein said method further comprises:
    mapping image data from x-y positions along said first substantially flat surface along an optical system to the plane of said first image sensor and to the plane of said second image sensor.

6. The method of claim 5 wherein said mapping image data from x-y positions along said first substantially flat surface along an optical system to plane of said first image sensor and to the plane of said second image sensor further comprises:
    mapping image data from an aspheric mirror, said optical system further comprising said aspheric mirror, to the plane of said first image sensor and to the plane of said second image sensor.

* * * * *